United States Patent
Muras et al.

(10) Patent No.: US 9,244,974 B2
(45) Date of Patent: Jan. 26, 2016

(54) OPTIMIZATION OF DATABASE QUERIES INCLUDING GROUPED AGGREGATION FUNCTIONS

(75) Inventors: Brian Robert Muras, Rochester, MN (US); Mark Steven Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1399 days.

(21) Appl. No.: 11/855,186

(22) Filed: Sep. 14, 2007

(65) Prior Publication Data

US 2009/0077010 A1    Mar. 19, 2009

(51) Int. Cl.
*G06F 7/00* (2006.01)
*G06F 17/30* (2006.01)

(52) U.S. Cl.
CPC .... *G06F 17/30442* (2013.01); *G06F 17/30536* (2013.01)

(58) Field of Classification Search
CPC ................................................ G06F 17/30536
USPC ............................................................ 707/3
See application file for complete search history.

(56) References Cited

U.S. PATENT DOCUMENTS 7,139,749 B2 * 11/2006 Bossman et al. ............. 707/714

OTHER PUBLICATIONS

U.S. Patent Application entitled, "Cardinality Statistic for Optimizing Database Queries with Aggregation Functions," filed Sep. 13, 2007, U.S. Appl. No. 11/854,590.

* cited by examiner

*Primary Examiner* — Ajith Jacob
(74) *Attorney, Agent, or Firm* — Patterson & Sheridan, LLP (57) ABSTRACT

Embodiments of the invention provide techniques for generating predicted cardinality statistics for grouped aggregation functions included in database queries. In general, characteristics of a database query are determined, and are then supplied to a probability function configured to generate a predicted cardinality statistic. The generated statistic represents a prediction of the probable cardinality of the results of a grouped aggregation function in the event that the query is executed. The predicted cardinality statistic may be used by a query optimizer to determine an efficient query plan for executing the database query.

27 Claims, 5 Drawing Sheets

OPTIMIZATION OF DATABASE QUERIES INCLUDING GROUPED AGGREGATION FUNCTIONS

BACKGROUND OF THE INVENTION

1. Field of the Invention

The invention generally relates to computer database systems. More particularly, the invention relates to techniques for optimization of database queries including grouped aggregation functions.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS).

Each table in a relational database includes a set of one or more columns. Each column typically specifies a name and a data type (e.g., integer, float, string, etc.), and may be used to store a common element of data. For example, in a table storing data about patients treated at a hospital, each patient might be referenced using a patient identification number stored in a "patient ID" column. Reading across the rows of such a table would provide data about a particular patient. Tables that share at least one attribute in common are said to be "related." Further, tables without a common attribute may be related through other tables that do share common attributes. A path between two tables is often referred to as a "join," and columns from tables related through a join may be combined to from a new table returned as a set of query results.

A query of a relational database may specify which columns to retrieve data from, how to join the columns together, and conditions (predicates) that must be satisfied for a particular data item to be included in a query result table. Current relational databases require that queries be composed in query languages. A commonly used query language is Structured Query Language (SQL). However, other query languages are also used.

Typically, query languages provide aggregation functions to enable some computation or summarization of query results. SQL aggregation functions include COUNT (counts the number of values in a column), SUM (sums all values stored in a column), AVG (computes the average value in a group), MIN (determines the smallest value in a column), and MAX (determines the largest value in a column). Aggregation functions are often included in grouped queries, meaning queries where the results are grouped according to values in one or more columns. In SQL, such grouped queries are composed using a GROUP BY clause.

Once composed, a query is executed by the DBMS. Typically, the DBMS interprets the query to determine a set of steps (hereafter referred to as a "query plan") that must be carried out to execute the query. However, in most cases, there are alternative query plans that can be carried out to execute a given query. Thus, the DBMS often includes a query optimizer, which selects the query plan that is likely to be the most efficient (i.e., requiring the fewest system resources, such as processor time and memory allocation).

Query optimizers typically operate by evaluating database statistics, including column statistics. That is, the query plan is selected based on statistical characteristics of the data in the fields (i.e., columns) required for the query. Thus, effective query execution requires optimization of queries that include grouped aggregation functions.

SUMMARY OF THE INVENTION

One embodiment of the invention provides a computer-implemented method, comprising: determining characteristics of a database query having a grouped aggregation function; supplying the characteristics to a probability function configured to generate a predicted cardinality statistic, wherein the predicted cardinality statistic represents a prediction of a probable cardinality of results of the grouped aggregation function in the event that the database query is executed; calculating, by means of the probability function, the predicted cardinality statistic; and outputting the predicted cardinality statistic.

Another embodiment of the invention provides a computer readable storage medium containing a program which, when executed, performs an operation, comprising: determining characteristics of a database query having a grouped aggregation function; supplying the characteristics to a probability function configured to generate a predicted cardinality statistic, wherein the predicted cardinality statistic represents a prediction of a probable cardinality of results of the grouped aggregation function in the event that the database query is executed; calculating, by means of the probability function, the predicted cardinality statistic; and outputting the predicted cardinality statistic.

Yet another embodiment of the invention includes a system, comprising: a database; a processor; and a memory containing a program, which when executed by the processor is configured to provide a predicted cardinality statistic for a grouped aggregation function of a database query. The program is configured to: determine characteristics of a database query having a grouped aggregation function; supply the characteristics to a probability function configured to generate a predicted cardinality statistic, wherein the predicted cardinality statistic represents a prediction of a probable cardinality of results of the grouped aggregation function in the event that the database query is executed; calculate, by means of the probability function, the predicted cardinality statistic; and output the predicted cardinality statistic.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

One database statistic frequently used by query optimizers is the column cardinality, meaning the number of distinct values stored in a column. However, column cardinality is usually not suitable for optimizing queries including grouped aggregation functions. This is because optimizing such queries requires information on the cardinality of the grouped aggregation functions, which cannot be determined from conventional column cardinality statistics. Thus, query optimizers could utilize alternative statistics to optimize such queries, for example the cardinality of an underlying column of the query. However, such approaches provide little or no accuracy as to the grouped aggregation function, and thus result in inaccurate and inefficient query plans.

Embodiments of the invention provide techniques for generating predicted cardinality statistics for grouped aggregation functions included in database queries.

In general, characteristics of a database query are determined, and are then supplied to a probability function configured to generate a predicted cardinality statistic. The generated statistic represents a prediction of the probable cardinality of the results of a grouped aggregation function in the event that the query is executed. The predicted cardinality statistic may be used by a query optimizer to determine an efficient query plan for executing the database query.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
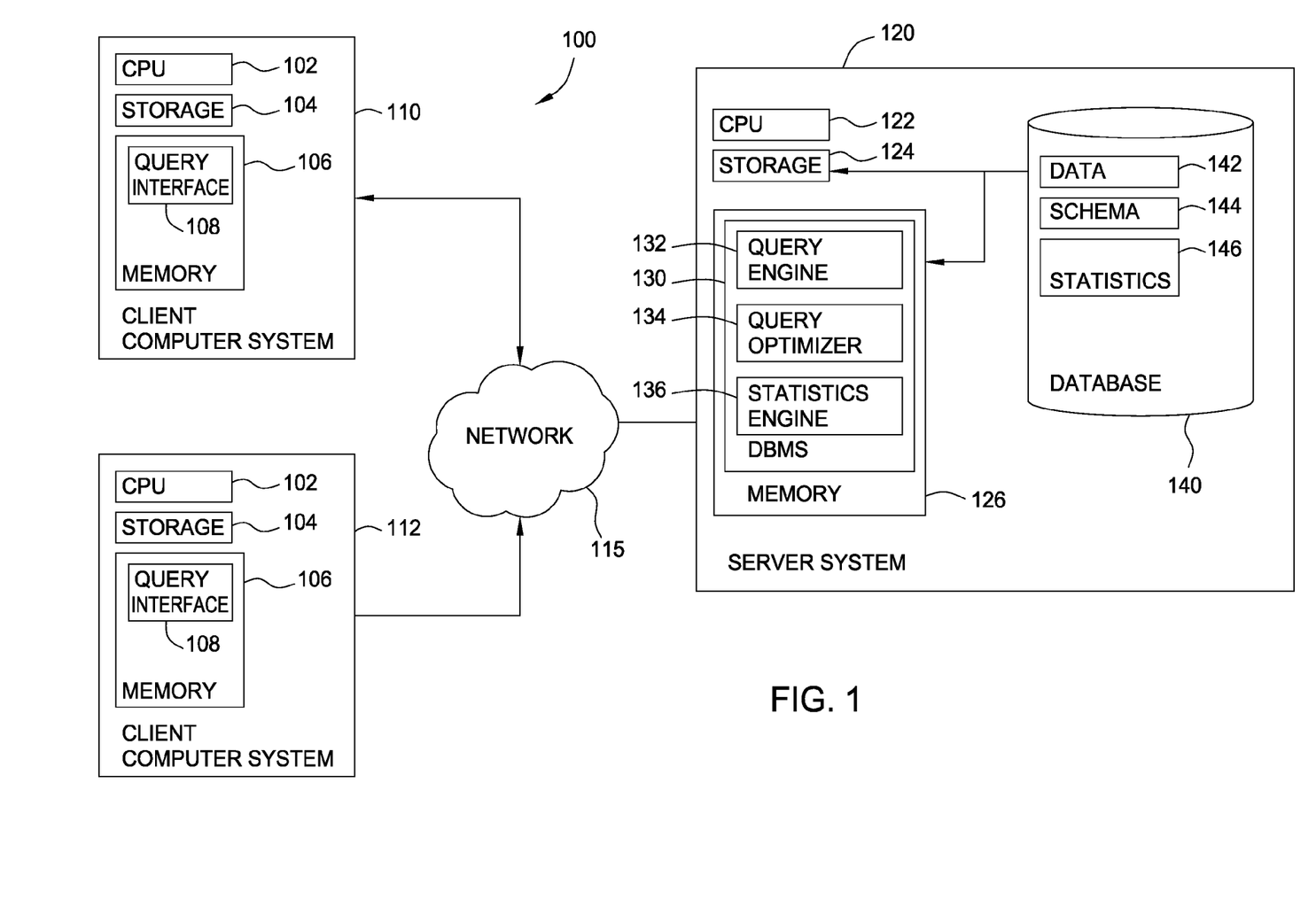
FIG. 1 is a block diagram illustrating a network environment, according to one embodiment of the invention.

FIG. 1 is a block diagram that illustrates a client server view of computing environment 100, according to one embodiment of the invention. As shown, computing environment 100 includes two client computer systems 110 and 112, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, client computer systems 110 and 112 each include a CPU 102, storage 114 and memory 106, typically connected by a bus (not shown). CPU 102 is a programmable logic device that performs all the instruction, logic, and mathematical processing in a computer. Storage 104 stores application programs and data for use by client computer systems 110 and 112. Storage 104 includes hard-disk drives, flash memory devices, optical media and the like. The network 115 generally represents any kind of data communications network. Accordingly, the network 115 may represent both local and wide area networks, including the Internet. The client computer systems 110 and 112 are also shown to include a query tool 108 in memory 106. In one embodiment, the query tool 108 is software application that allows end users to access information stored in a database (e.g., database 140). Accordingly, the query tool 108 may allow users to compose and submit a query to a database system, which, in response, may be configured to process the query and return a set of query results. The query tool 108 may be configured to compose queries in a database query language, such as Structured Query Language (SQL). However, it should be noted that the query tool 108 is only shown by way of example; any suitable requesting entity may submit a query (e.g., another application, an operating system, etc.).

In one embodiment, the server 120 includes a CPU 122, storage 124, memory 126, a database 140, and a database management system (DBMS) 130. The database 140 includes data 142, schema 144 and statistics 146. The data 142 represents the substantive data stored by the database 140. The schema 144 represents the structure of the elements of the database 140 (i.e., tables, views, fields, keys, indexes, etc.). The statistics 146 may include various elements of metadata describing the characteristics of the database 140.

The DBMS 130 provides a software application used to organize, analyze, and modify information stored in the database 140. The DBMS 130 includes a query engine 132, a query optimizer 134, and a statistics engine 136. The query engine 132 may be configured to process database queries submitted by a requesting application (e.g., a query generated using query tool 108) and to return a set of query results to the requesting application. The query optimizer 134 may be configured to select an efficient query plan, or series of executed instructions, for executing a query. The query optimizer 134 may select an efficient query plan by determining which query plan is likely to require the fewest system resources (e.g., processor time, memory allocation, etc.) To make this determination, the query optimizer 134 utilizes the statistics 146, which may describe characteristics of elements of the database 140 included in the query.

Figure 2:
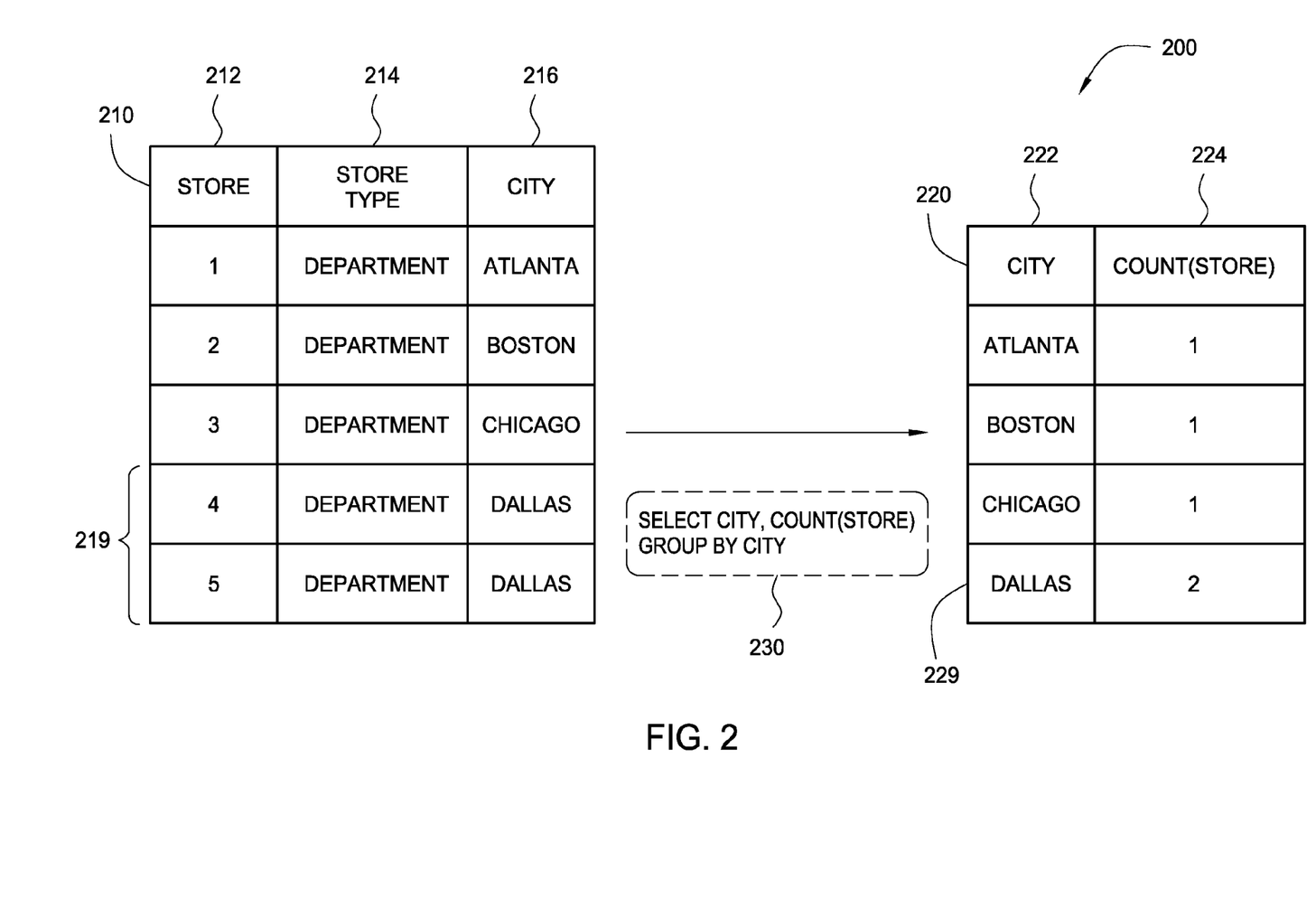
FIG. 2 illustrates a conceptual view of an exemplary query including a grouped aggregation function, according to one embodiment of the invention.

FIG. 2 illustrates a conceptual view 200 of an exemplary query including a grouped aggregation function, according to one embodiment of the invention. As shown, the conceptual view 200 illustrates a query statement 230 configured to retrieve data from a table 210 in order to produce a query result 220. The table 210 stores data records corresponding to five retail stores, and includes a STORE column 212, a STORE TYPE column 214, and a CITY column 216.

As indicated by the values stored in the STORE TYPE column 214, the table 210 only stores records for department stores, meaning large stores having various departments of merchandise. Note that the query statement 230 includes a GROUP BY CITY clause. In the SQL language, the GROUP BY clause serves to group query results according to the values of the grouped column. In this case, the grouping is performed according to the values stored in the CITY column 216. Accordingly, the query result 220 includes a CITY column 222, which includes a single instance of each CITY value stored in column 216. For instance, note that the rows 219 of table 210 are grouped according to the city value "DALLAS," resulting in the single grouped row 229 of query result 220.

Additionally, the query statement 230 includes a COUNT (STORE) aggregation function. In the SQL language, the COUNT aggregation function serves to count the number of values of a column that are aggregated in each grouping produced by the GROUP BY clause. In this example, the aggregation function returns the number of values in the STORE column 212 that are grouped by each CITY value (i.e., number of stores in each city). Accordingly, the query result 220 includes a COUNT(STORE) column 224, which includes the number of stores grouped for each CITY value. Thus, the query result 220 may be used, e.g., to determine how many stores are present in each city.

As described, in the situation where the query statement 230 is to be executed, a query plan may be generated by the query optimizer 134 using statistics 146. One important statistic for such use is the cardinality (i.e., the number of unique values) of the columns or functions included in the query. However, the cardinality of the COUNT(STORE) aggregation function is not included in statistics 146, since it is not known before the query is executed. Conventionally, query optimizers may instead use the cardinalities of the underlying columns of the query. However, this approach is a weak substitute for the cardinality of the aggregation function. Note that, in this example, the COUNT(STORE) column 224 only includes the values "1" and "2," so the cardinality is two. In contrast, the cardinality of the underlying STORE column 212 is five, and the cardinality of the underlying CITY column 216 is four. Thus, neither of the underlying cardinalities is useful as a substitute for the cardinality of the grouped aggregation function.

Referring again to FIG. 1, the statistics engine 136 may be configured to provide predicted statistics describing characteristics of grouped aggregation functions. Such predicted statistics may be used by the query optimizer 134, which may be configured to optimize queries including grouped aggregation functions. For example, the statistics engine 136 may generate a predicted cardinality of the COUNT(STORE) aggregation function shown in FIG. 2. The query optimizer 134 may then use the predicted cardinality to generate a query plan for the query statement 230.

In one embodiment, the predicted statistic may be generated by applying probability theory to characteristics of the query. That is, the predicted statistic may be generated by plugging query characteristics into a probability function configured to predict the cardinality of the grouped aggregation function. In one embodiment, the probability function used may be a function for determining the probability of independent events. Such a probability function may take the following form:

$$P=1-(1-p)^N$$

Here, P is the probability that N independent events will occur, where each event has p probability of occurring. In another embodiment, the probability function may be a function for determining the probability of dependent events. Such a probability function may take the following form:

$$P=\min(p_1, p_2, \ldots, p_N)$$

Of course, one skilled in the art will recognize that other forms of probability functions may be used as suited to the intended use.

In one embodiment, the query characteristics used with the probability function may include the number of rows returned by a query if executed without grouping, and the number of groups returned by the query if grouped. A method for using such query characteristics to calculate predicted cardinalities for grouped aggregation functions is described below with respect to FIG. 3. In another embodiment, other query characteristics may be used with the probability function. For example, it is contemplated that the attributes of query elements may be used as query characteristics. In the case of a SQL query, such query characteristics may include attributes of any GROUP BY, WHERE, JOIN, and/or HAVING clauses contained in the query. Also, such query characteristics may include attributes of the aggregation functions.

Of course, FIGS. 1 and 2 are included for illustrative purposes only, and are not limiting of the invention. Other embodiments are broadly contemplated. For example, the functionality of the statistics engine 136 may be incorporated into the query optimizer 134. This and other combinations may be configured to suit particular situations, and are thus contemplated to be in the scope of the invention.

Figure 3:
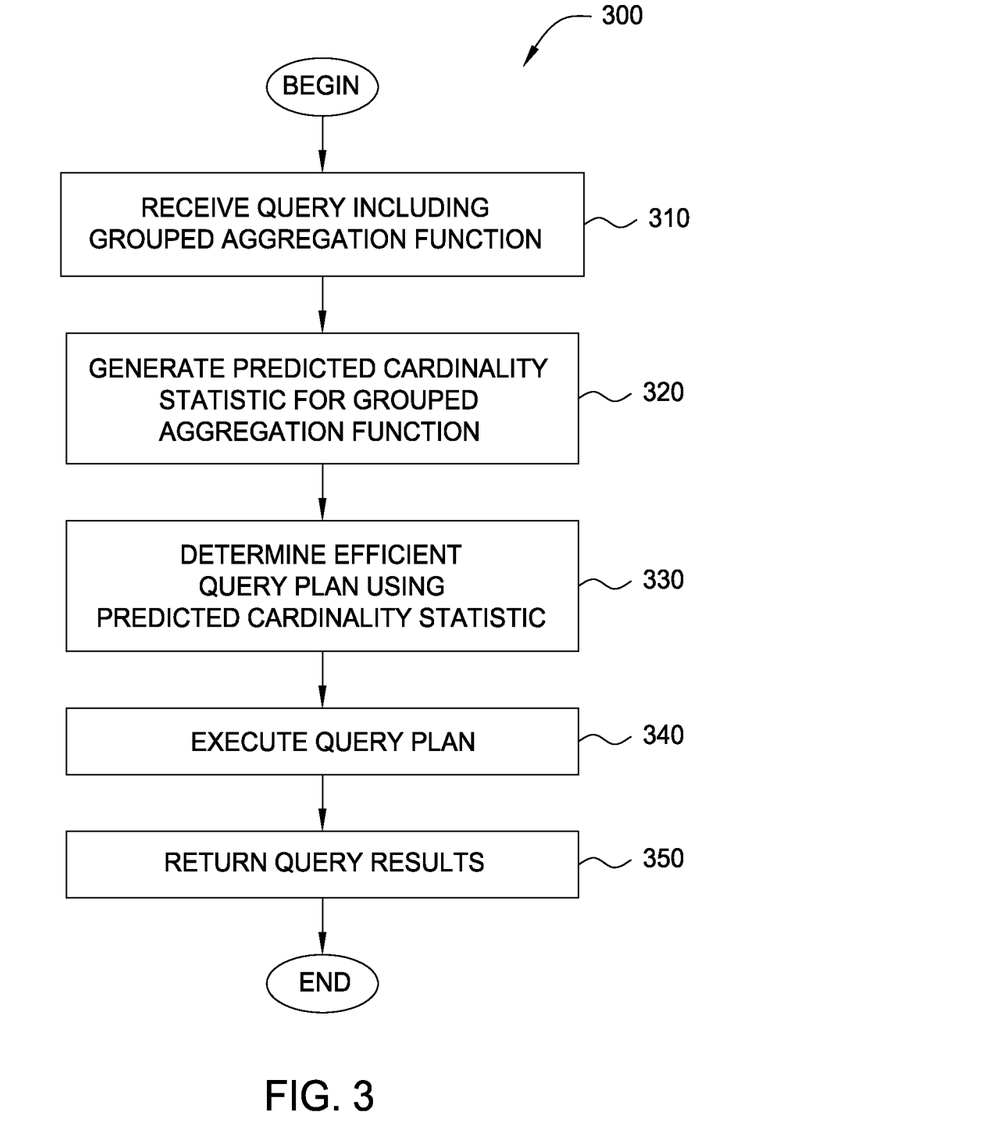
FIG. 3 is a flow diagram illustrating a method for optimizing a database query including a grouped aggregation function, according to one embodiment of the invention.

FIG. 3 is a flow diagram illustrating a method 300 for optimizing a database query including a grouped aggregation function, according to one embodiment of the invention. Persons skilled in the art will understand that, even though the method is described in conjunction with the systems of FIGS. 1-2, any system configured to perform the steps of method 300, in any order, is within the scope of the present invention.

The method 300 begins at step 310, when a database query including a grouped aggregation function is received. For example, a query may be created by a user interacting with a query tool 108, and may be received by a DBMS 130 on a server system 120. At step 320, a predicted cardinality statistic for the grouped aggregation function may be generated. The predicted cardinality statistic may be generated, for example, by the statistics engine 136 illustrated in FIG. 1. Methods to provide the function of step 320 are described in further detail below with respect to FIGS. 4 and 5.

At step 330, the predicted cardinality statistic may be used to determine an efficient query plan for executing the query. For example, the predicted cardinality statistic may be used by the query optimizer 134 to determine an efficient query plan. At step 340, the determined query plan may be followed in order to execute the query. For example, the determined query plan may be carried out by the query engine 132 illustrated in FIG. 1. Optionally, the determined query plan may be saved for future use to execute similar queries (e.g., the same query but with different parameter values). At step 350, the query results may be returned. For example, the query results produced by query engine 132 according to the determined query plan may be presented to a user in the query tool 108. After step 350, the method 300 terminates.

Figure 4:
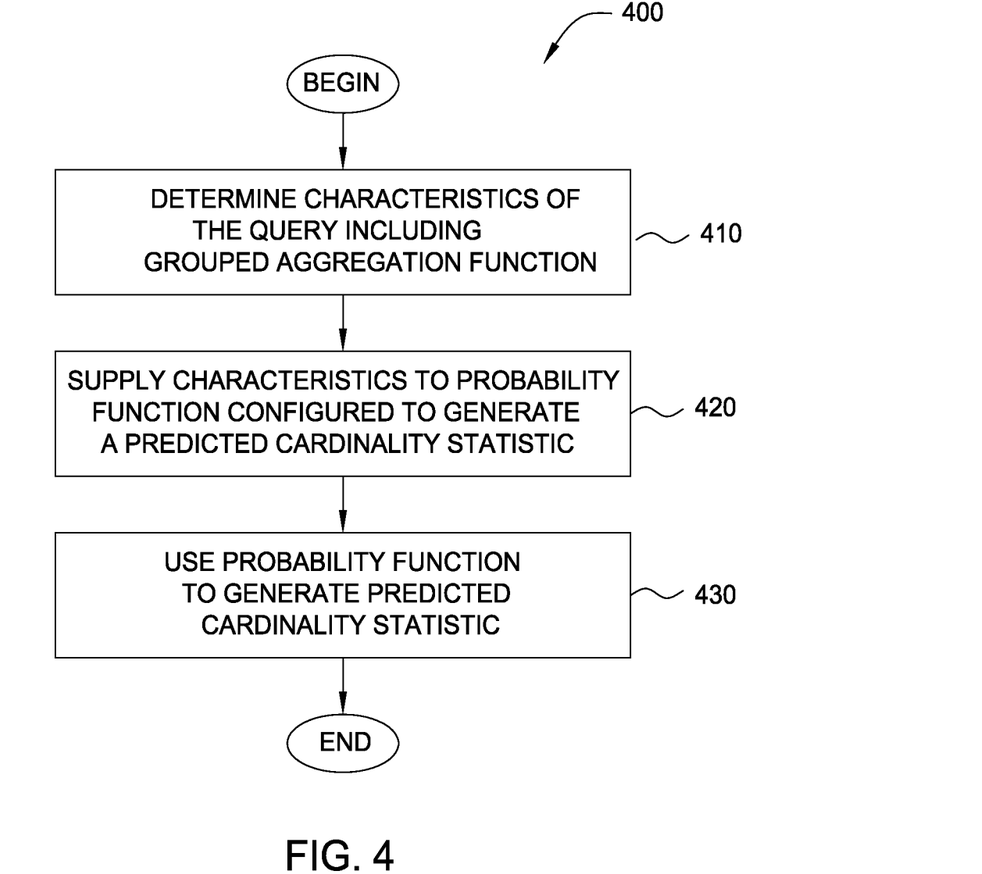
FIG. 4 is a flow diagram illustrating a method for generating predicted cardinality statistics for aggregation functions included in database queries, according to one embodiment of the invention.

FIG. 4 is a flow diagram illustrating a method 400 for generating predicted cardinality statistics for aggregation functions included in database queries, according to one embodiment of the invention. The method 400 represents one embodiment of the step 320 of the method 300 illustrated in FIG. 3. Persons skilled in the art will understand that, even though the method is described in conjunction with the systems of FIGS. 1-2, any system configured to perform the steps of method 400, in any order, is within the scope of the present invention.

The method 400 begins at step 410 by determining characteristics of a query including a grouped aggregation function (i.e., the query received at step 310 of method 300). Such characteristics of the query may include the number of rows returned by the query if executed without grouping, the number of groups returned by the query if executed with grouping, and/or the average number of rows per group. In the case of a SQL query, the characteristics of the query may also include attributes of any GROUP BY, WHERE, JOIN, or HAVING clauses. Also, such characteristics of the query may include attributes of the aggregation function itself.

At step 420, the characteristics of the query may be supplied to a probability function configured to calculate a predicted cardinality statistic for grouped aggregation functions. Such probability function may be based on calculations of the probability of multiple independent events, or of the probability of multiple dependent events. At step 430, the probability function may be used to generate a predicted cardinality statistic for the grouped aggregation function of the query. After step 430, the method 400 terminates. The steps of method 400 may be performed, for example, by the statistics engine 136 illustrated in FIG. 1.

Figure 5:
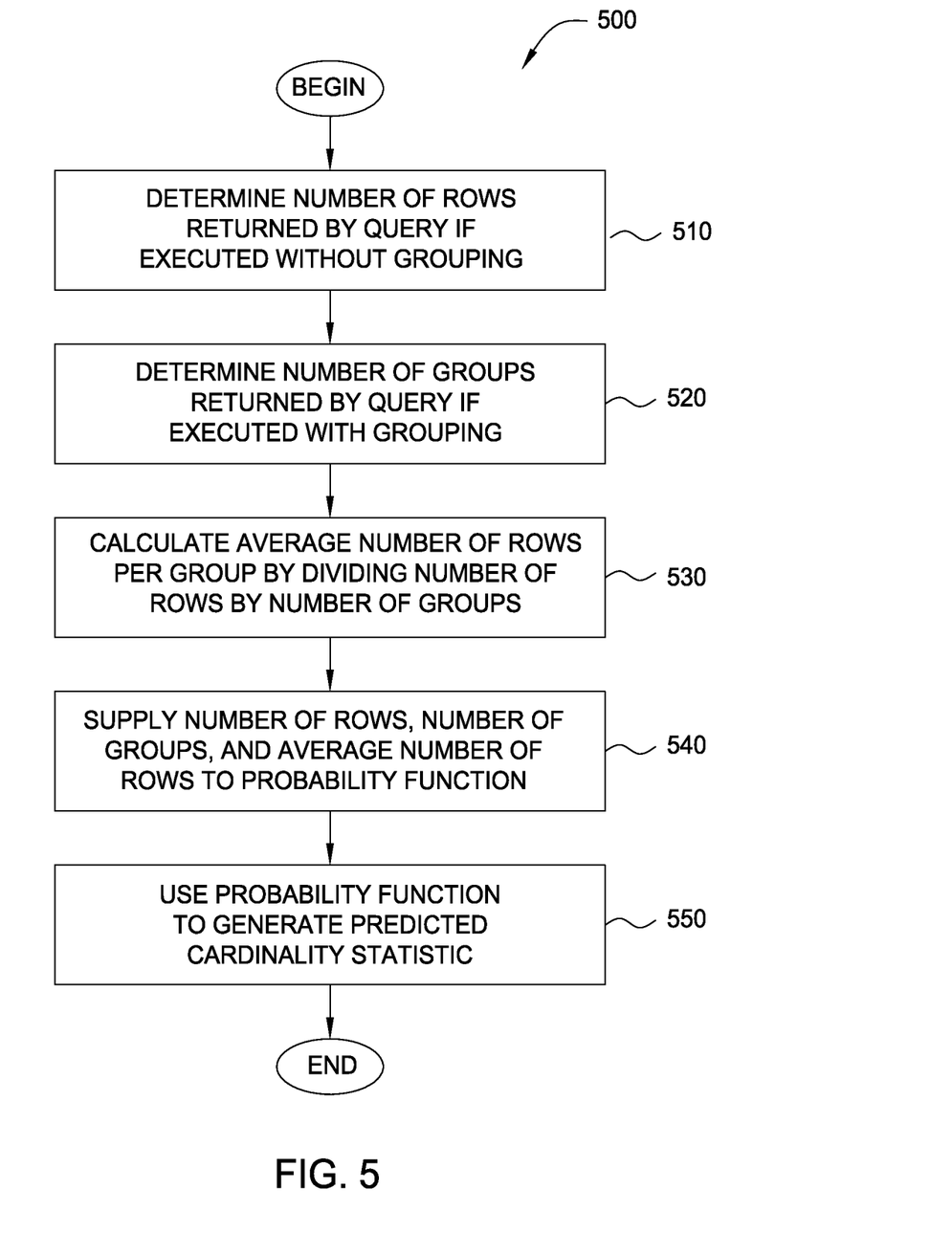
FIG. 5 is a flow diagram illustrating a method for generating predicted cardinality statistics for aggregation functions included in database queries, according to one embodiment of the invention.

FIG. 5 is a flow diagram illustrating a method 500 for generating predicted cardinality statistics for aggregation functions included in database queries, according to one embodiment of the invention. The method 500 represents the step 320 of the method 300 illustrated in FIG. 3. Persons skilled in the art will understand that, even though the method is described in conjunction with the systems of FIGS. 1-2, any system configured to perform the steps of method 500, in any order, is within the scope of the present invention.

The method 500 begins at step 510 by determining the number of rows returned by the query if it was executed without grouping. For example, the statistics engine 136 illustrated in FIG. 1 may be configured to determine the number of rows returned by a SQL query if executed without grouping (i.e., ignoring a GROUP BY clause of the query). At step 520, the number of groups returned by the query is determined. For example, the statistics engine 136 may be configured to determine the number of groups returned by a SQL query executed according to a GROUP BY clause.

At step 530, the number of rows may be divided by the number of groups to calculate an average number of rows per group. At step 540, the number of rows, the number of groups, and the average number of rows may be supplied to a probability function configured to calculate a predicted cardinality statistic for grouped aggregation functions. At step 550, the probability function may be used to generate a predicted cardinality statistic for the grouped aggregation function of the query. After step 550, the method 500 terminates. The steps of method 500 may be performed, for example, by the statistics engine 136 illustrated in FIG. 1.

While the foregoing is directed to embodiments of the present invention, other and further embodiments of the invention may be devised without departing from the basic scope thereof, and the scope thereof is determined by the claims that follow.

What is claimed is:

1. A computer-implemented method to optimize database queries having grouped aggregation functions, the computer-implemented method comprising:
    determining characteristics of a database query having a grouped aggregation function;
    generating, by operation of one or more computer processors, a predicted cardinality statistic based on a probability function and the determined characteristics and without executing the database query, wherein the predicted cardinality statistic predicts a probable cardinality of results of the grouped aggregation function;
    selecting, from a plurality of candidate query plans and based at least on the predicted cardinality statistic, a first candidate query plan to use in executing the database query, thereby optimizing the database query based on the predicted cardinality statistic; and
    executing the selected query plan in order to generate a set of query results, wherein the set of query results is returned to a requesting entity.

2. The computer-implemented method of claim 1, wherein the probability function is configured to determine a probability that multiple independent events will occur.

3. The computer-implemented method of claim 1, wherein the probability function is configured to determine a probability that multiple dependent events will occur.

4. The computer-implemented method of claim 1, wherein the characteristics of the database query are selected from the group comprising: (i) a number of rows returned by the database query if executed without grouping, (ii) a number of groups returned by the database query if executed with grouping, and (iii) an average number of rows per group.

5. The computer-implemented method of claim 1, wherein the database query is composed in the Structured Query Language (SQL) query language.

6. The computer-implemented method of claim 5, wherein the grouped aggregation function included in the database query is selected from the COUNT, AVG, SUM, MIN, MAX, VARIANCE, and STANDARD_DEVIATION aggregation functions.

7. The computer-implemented method of claim 5, wherein the characteristics of the database query are selected from the group comprising: (i) attributes of a GROUP BY clause, (ii) attributes of a WHERE clause, (ii) attributes of a JOIN clause, (iv) attributes of a HAVING clause, and (v) attributes of the grouped aggregation function.

8. A computer readable storage medium containing a program which, when executed, performs an operation to optimize database queries having grouped aggregation functions, the operation comprising:
    determining characteristics of a database query having a grouped aggregation function;
    generating, by operation of one or more computer processors when executing the program, a predicted cardinality statistic based on a probability function and the determined characteristics and without executing the database query, wherein the predicted cardinality statistic predicts a probable cardinality of results of the grouped aggregation function;
    selecting, from a plurality of candidate query plans and based at least on the predicted cardinality statistic, a first candidate query plan to use in executing the database query, thereby optimizing the database query based on the predicted cardinality statistic; and
    executing the selected query plan in order to generate a set of query results, wherein the set of query results is returned to a requesting entity.

9. The computer readable storage medium of claim 8, wherein the probability function is configured to determine a probability that multiple independent events will occur.

10. The computer readable storage medium of claim 8, wherein the probability function is configured to determine a probability that multiple dependent events will occur.

11. The computer readable storage medium of claim 8, wherein the characteristics of the database query are selected from the group comprising (i) a number of rows returned by the database query if executed without grouping, (ii) a number of groups returned by the database query if executed with grouping, and (iii) an average number of rows per group.

12. The computer readable storage medium of claim 8, wherein the database query is composed in the Structured Query Language (SQL) query language.

13. The computer readable storage medium of claim 12, wherein the grouped aggregation function included in the database query is selected from the COUNT, AVG, SUM, MIN, MAX, VARIANCE, and STANDARD_DEVIATION aggregation functions.

14. The computer readable storage medium of claim 12, wherein the characteristics of the database query are selected from the group comprising: (i) attributes of a GROUP BY clause, (ii) attributes of a WHERE clause, (ii) attributes of a JOIN clause, (iv) attributes of a HAVING clause, and (v) attributes of the grouped aggregation function.

15. A system to optimize database queries having grouped aggregation functions, the system comprising:
    a database;
    a processor; and
    a memory containing a program, wherein the program is configured to:
        determine characteristics of a database query having a grouped aggregation function;
        generate a predicted cardinality statistic based on a probability function and the determined characteristics and without executing the database query, wherein the predicted cardinality statistic predicts a probable cardinality of results of the grouped aggregation function;
        select, from a plurality of candidate query plans and based at least on the predicted cardinality statistic, a first candidate query plan to use in executing the database query, thereby optimizing the database query based on the predicted cardinality statistic; and
        execute the selected query plan in order to generate a set of query results, wherein the set of query results is returned to a requesting entity.

16. The system of claim 15, wherein the probability function is configured to determine a probability that multiple independent events will occur.

17. The system of claim 15, wherein the probability function is configured to determine a probability that multiple dependent events will occur.

18. The system of claim 15, wherein the characteristics of the database query are selected from the group comprising: (i) a number of rows returned by the database query if executed without grouping, (ii) a number of groups returned by the database query if executed with grouping, and (iii) an average number of rows per group.

19. The system of claim 15, wherein the database query is composed in the Structured Query Language (SQL) query language.

20. The system of claim 19, wherein the grouped aggregation function included in the database query is selected from the COUNT, AVG, SUM, MIN, MAX, VARIANCE, and STANDARD_DEVIATION aggregation functions.

21. The system of claim 19, wherein the characteristics of the database query are selected from the group comprising: (i) attributes of a GROUP BY clause, (ii) attributes of a WHERE clause, (ii) attributes of a JOIN clause, (iv) attributes of a HAVING clause, and (v) attributes of the grouped aggregation function.

22. The computer-implemented method of claim 1, wherein the predicted cardinality statistic causes selection of the first candidate query plan, wherein without the predicted cardinality statistic, a second candidate query plan, different from the first candidate query plan, is selected.

23. The computer-implemented method of claim 22, wherein in candidate query plan selection, the predicted cardinality statistic is used in lieu of an actual cardinality statistic of an underlying column of the database query, wherein the actual cardinality is not predicted, wherein the second candidate query plan is selected based on the actual cardinality statistic.

24. The computer-implemented method of claim 23, wherein the first query plan is selected by a query optimizer configured to receive the predicted cardinality statistic, wherein in respective instances, the probability function is configured to: (i) determine a probability that multiple independent events will occur; and (ii) determine a probability that multiple dependent events will occur.

25. The computer-implemented method of claim 24, wherein the characteristics of the database query include: (i) a count of rows returned by the database query if executed without grouping; (ii) a count of groups returned by the database query if executed with grouping; and (iii) an average count of rows per group.

26. The computer-implemented method of claim 25, wherein the database query is composed in the Structured Query Language (SQL) query language, wherein the grouped aggregation function included in the database query is, in respective instances: COUNT, AVG, SUM, MIN, MAX, VARIANCE, and STANDARD_DEVIATION aggregation functions.

27. The computer-implemented method of claim 26, wherein the characteristics of the database query are, in respective instances: (i) attributes of a GROUP BY clause; (ii) attributes of a WHERE clause; (ii) attributes of a JOIN clause; (iv) attributes of a HAVING clause; and (v) attributes of the grouped aggregation function.

* * * * *